Feb. 18, 1969    J. BRITT ETAL    3,428,243
COMPRESSORS OR TURBINES FOR GAS TURBINE ENGINES
Filed Aug. 28, 1967

Inventors
JACK BRITT
FRANCIS ALAN SWAIN
By
Cushman, Darby & Cushman
Attorneys

United States Patent Office 3,428,243
Patented Feb. 18, 1969

3,428,243
COMPRESSORS OR TURBINES FOR GAS TURBINE ENGINES
Jack Britt, Ambergate, and Francis Alan Swain, Burton-on-Trent, England, assignors to Rolls-Royce Limited, Derby, England, a British company
Filed Aug. 28, 1967, Ser. No. 663,892
Claims priority, application Great Britain, Oct. 20, 1966, 46,881/66; May 18, 1967, 23,120/67
U.S. Cl. 230—122          3 Claims
Int. Cl. F04d 19/02, 29/40

ABSTRACT OF THE DISCLOSURE

A turbomachine such as a compressor or turbine for a gas turbine engine is provided with separate thin seal-carrying discs on which are mounted sealing means so that the weight of the rotor discs may be reduced.

---

The present invention relates to turbomachines such as compressors or turbines for gas turbine engines.

According to the present invention a compressor or turbine for a gas turbine engine comprises a plurality of rotor and stator stages, each rotor stage comprising a rotor disc carrying a plurality of blades on the periphery thereof, sealing means disposed between each two successive rotor discs and adapted to prevent leakage of working fluid from between the stages, the sealing means being carried on separate seal-carrying discs which are connected to the rotor discs by supporting structures.

The sealing means are preferably arranged to cooperate with means on the stator stages to prevent leakage of air therebetween.

Each supporting structure is disposed between and connected to a seal-carrying disc and the adjacent rotor disc. Thus each structure may comprise a plurality of frusto-conical members.

The frusto-conical members of each structure may be made up from separate members but are preferably formed as a single integral structure.

The supporting structures are preferably designed to have sufficient strength and rigidity to transmit the drive from the engine main shaft to the respective discs.

In a further preferred embodiment each blade is provided with a root portion which is divided to form two substantially radially extending prongs, the radially outer periphery of each rotor disc being formed with two radially extending circumferential projections to which the prongs of the blade roots are attached.

The rotor blades are preferably attached to the rotor discs by a metallurgical joint, for example, diffusion bonding, brazing or welding. Thus the blades may be porvided with forked roots which fit over the disc rim.

The invention will now be more particularly described in relation to a gas turbine engine compressor, merely by way of example, with reference to the accompanying drawings in which.

As the speed of rotation of a compressor rotor disc increases there comes a point at which the stresses in the material of the disc are so great that the material outside a certain radius ceases to be self-supporting, and the thickness of the disc hub has to be increased to give additional support. In the case of a very high speed compressor the radius at which the material ceases to be self-supporting, known as the free hoop radius, can become so small that the disc hub has to be made disproportionately large and the weight penalty becomes very high. It is imperative therefore that as little weight of material as possible in high speed compressors and turbines, lies outside the free hoop radius. The present invention has for its object to produce a high speed compressor or turbine which is light in weight as compared with conventional compressors and turbines and this is accomplished by removing the conventional sealing means from the rotor discs themselves and carrying them on separate seal-carrying discs, and further by attaching the rotor blades to the rotor discs by a metallurgical joint, for example diffusion bonding, welding or brazing.

Figure 1:
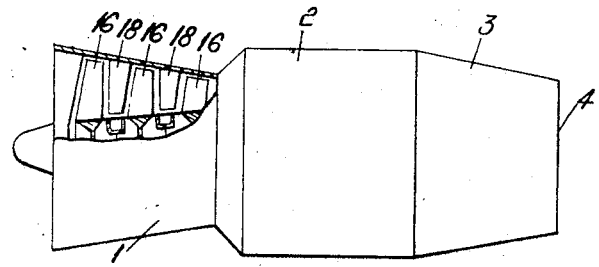
FIGURE 1 illustrates a gas turbine engine embodying a compressor constructed according to the present invention.

Referring now to the drawings there is shown in FIGURE 1 a gas turbine engine having compressor means 1, combustion equipment 2, turbine means 3 and exhaust nozzle 4.

Figure 2:
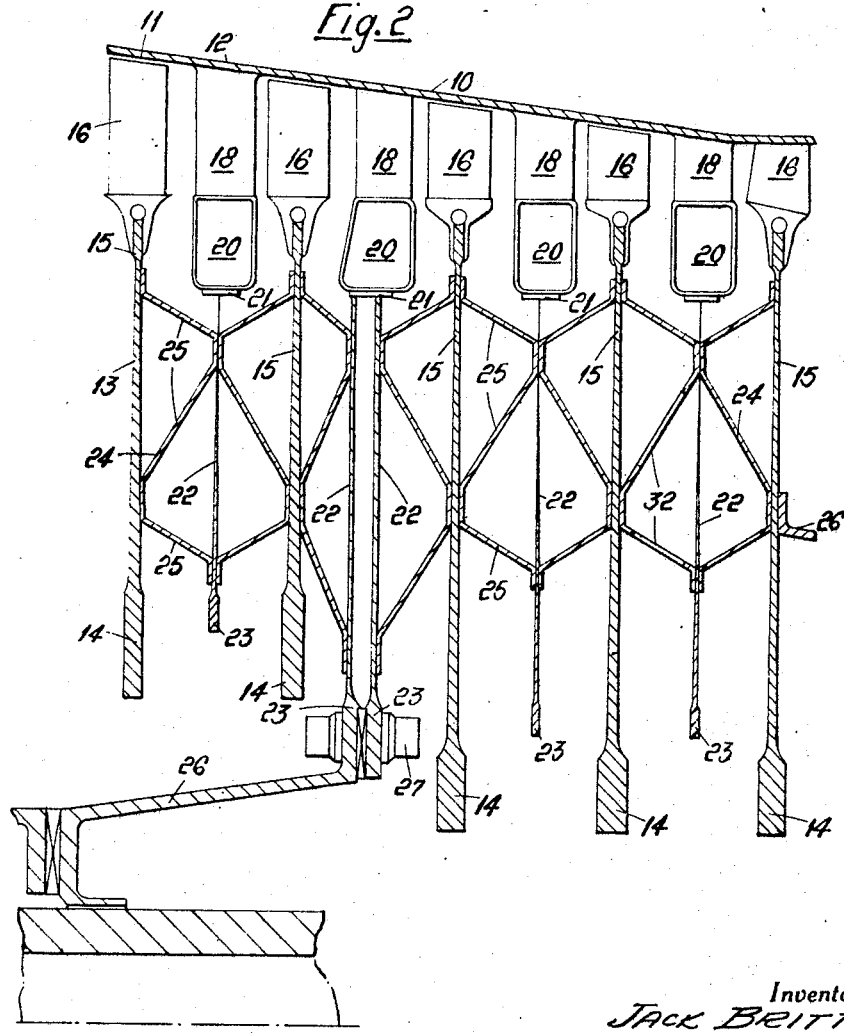
FIGURE 2 is a more detailed sectional elevation of the compressor of the engine of FIGURE 1.

The compressor 1 is shown in more detail in FIGURE 2 and comprises an outer casing 10 within which are mounted a plurality of rotor stages 11 and stator stages 12. Each rotor stage comprises a rotor disc 13 having a radially inner hub portion 14 which supports a radially outer rim 15 on which are mounted a plurality of rotor blades 16.

Each stator stage comprises an aerodynamic blade portion 18 mounted between the casing 10 and an annular box structure 20. Disposed on the radially inner portions of the box structure 20 are sealing means 21 which cooperate with sealing means on the tips of seal-carrying discs 22. The seal-carrying discs 22 are made as thin as possible and those parts of the discs which lie outside the free hoop radius are supported from central hubs 23.

Both the seal-carrying discs 22 and the rotor discs 13 are of relatively large diameter and small thickness. The various compressor discs cannot be bolted together to form a rigid assembly since the bolt would have to be disposed within the free hoop radius which would leave deep unstable discs. The whole compressor assembly is therefore braced by means of supporting structures 24 in the form of frusto-conical members 25 which extend between each seal-carrying disc 22 and the adjacent rotor discs 13. Each supporting structure is formed either integrally, or as a number of separate members, from sheets of metal which are brazed or welded onto the respective discs. The supporting structure 24 is also made sufficiently strong to transmit the driving forces from the shaft 26 to the various discs.

The compressor may be made in two sections of different material the downstream section being metal of high heat resistant qualities and the upstream being a cheaper and/or lighter material. The two sections are bolted together by a bolt 27 which must be disposed within the free hoop radius of the disc.

The blades 16 are mounted on the rims 15 of the disc 13 by a metallurgic joint (in the manner described in U.S. Patent No. 3,304,055, issues Feb. 14, 1967, to Jack Britt and assigned to the same assignee, Rolls-Royce Limited, Derby, England, as the subject application) for example by diffusion bonding, brazing, or welding, which allows a relatively much thinner disc rim 15 to be provided as compared with conventional "fir tree roots."

In order to further reduce the weight of the assembly the inner sheet metal members 25 may be provided with holes, as shown at 32, the outer conical member remaining full for sealing purposes. Such holes would also facilitate inspection of the assembly.

Figure 3:
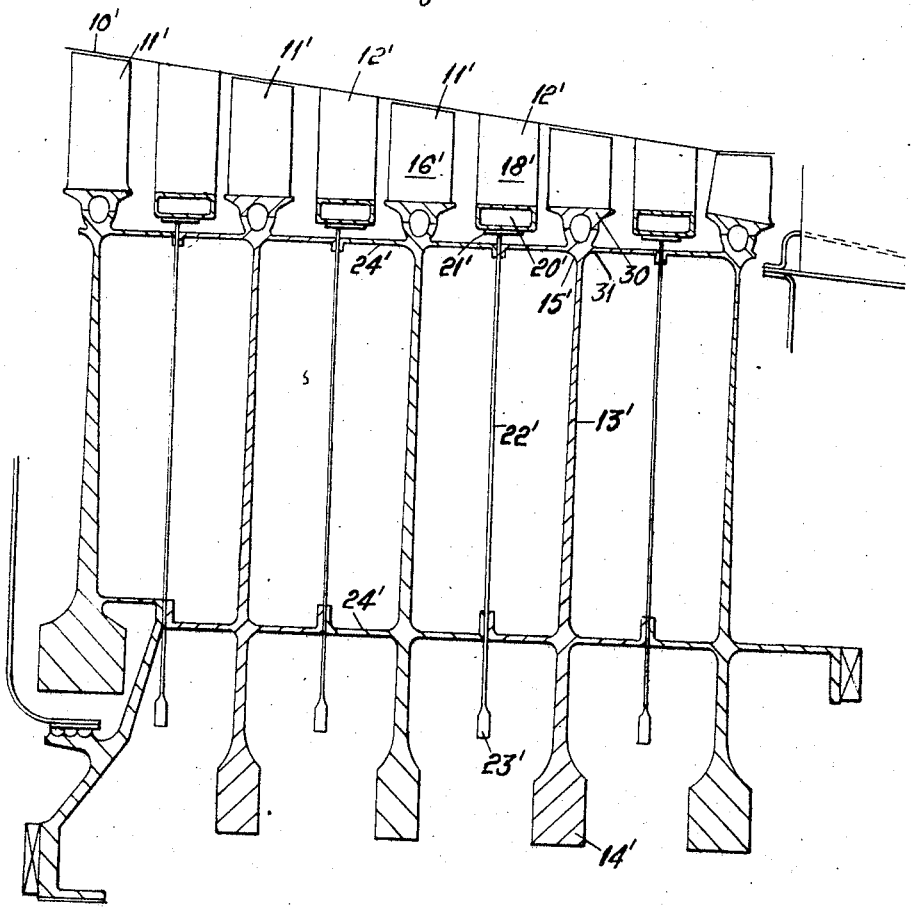
FIGURE 3 illustrates an alternative embodiment of the invention.

FIGURE 3 illustrates an alternative embodiment which is similar in construction to the embodiment of FIGURES 1 and 2 and those parts which are similar have been given the same reference numerals but with primes.

In this embodiment the rotor blade 16' are formed with forked root portions 30 which extends substantially radially and each of the rotor discs 13' is formed with a pair of radially extending circumferential projections 31 to which the two prongs 30 of the forked blade root are attached by a metallurgical joint. The use of a forked root on the blade and a pair of corresponding projections on the rotor disc provides a joint which has high resistance to the bending stresses produced by the axial thrust loads on the compressor or turbine.

The assembly may be built up in layers prior to jointing, the joint being formed in one operation by the application of heat and pressure.

The rotor discs 13 or 13' and the seal-carrying discs may be tapered from a relatively thick section at their radially inner portion to a relatively thin section at their radially outer portions.

In order to manufacture a tapered disc as described above, the disc may be mounted on an axle and dipped into an electro-chemical etching solution in which it is spun while being slowly withdrawn.

We claim:
1. In a turbomachine of the type having a plurality of rotor and stator stages, each rotor stage having a rotor disc and a plurality of blades mounted on the periphery thereof, and sealing means disposed between each two successive rotor discs for preventing leakage of working fluid from between the stages, the turbomachine being for a gas turbine engine, the improvement comprising: a plurality of separate seal-carrying discs, said sealing means being mounted on said seal-carrying discs; and supporting structure connecting said seal-carrying discs to said rotor discs, each supporting structure comprising a plurality of frusto-conical members, each of said frusto-conical members being connected to a seal-carrying disc and to an adjacent rotor disc.

2. In a turbomachine as claimed in claim 1 and in which the frusto-conical members form part of a single integral supporting structure.

3. A turbomachine as claimed in claim 1 and in which the supporting structure and the seal-carrying discs are the sole means of transmitting the drive between the rotor discs.

References Cited
UNITED STATES PATENTS

| | | | |
|---|---|---|---|
| 2,384,919 | 9/1945 | Huber. | |
| 2,702,687 | 2/1955 | Ledwith | 253—69 |
| 2,857,132 | 10/1958 | McDowall. | |
| 2,937,847 | 5/1960 | Stalker | 253—69 |

HENRY F. RADUAZO, *Primary Examiner.*

U. S. Cl. X.R.

230—133; 253—39